United States Patent [19]
Kaptanis et al.

[11] 3,938,793
[45] Feb. 17, 1976

[54] PNEUMATIC SPRING WITH STOP MECHANISM

[75] Inventors: Panayotis Kaptanis, Neuwied; Castor Fuhrmann, Brachtendorf, both of Germany

[73] Assignee: Stabilus GmbH, Koblenz-Neuendorf, Germany

[22] Filed: Aug. 26, 1974

[21] Appl. No.: 500,360

[30] Foreign Application Priority Data
Sept. 8, 1973  Germany............................ 2345503

[52] U.S. Cl. ................... 267/120; 188/300; 296/56
[51] Int. Cl.²........................................... F16F 9/32
[58] Field of Search ....... 267/120; 188/300; 296/56, 296/57; 160/192, 189

[56]  References Cited
UNITED STATES PATENTS
3,182,565  5/1965  Millard .............................. 188/300

FOREIGN PATENTS OR APPLICATIONS
2,007,955  5/1969  France............................... 188/300
523,902  4/1931  Germany........................... 188/300

*Primary Examiner*—James B. Marbert
*Attorney, Agent, or Firm*—Hans Berman

[57]  ABSTRACT

A pneumatic spring of the piston-and-cylinder type suitable for balancing the trunk lid of a motorcar and like applications is equipped with a stop mechanism which stops relative axial movement of the piston or piston rod and of the cylinder in response to a force axially applied to the spring, but releases the cylinder and piston or piston rod from each other in response to an applied force greater than the first-mentioned force. Cooperating stop members on the cylinder and piston rod engage each other as long as the relative axial movement of the principal spring elements is stopped.

11 Claims, 3 Drawing Figures

PNEUMATIC SPRING WITH STOP MECHANISM

This invention relates to pneumatic springs of the type in which a piston is axially movable in a cylinder, a piston rod projects axially from the cylinder cavity and is biased outward of the cavity by a compressed gas in the cylinder cavity. The invention more particularly relates to a pneumatic spring in which relative axial movement of the cylinder and piston rod may be stopped.

Pneumatic springs of the type described are known, and they are being employed for partly balancing the trunk lid of a motor car and like applications. It is also known to equip such a spring with a device which stops relative movement of the cylinder and piston rod. The known stopping devices are relatively inconvenient to use. They are located outside the cylinder cavity and mar the appearance of the spring. They must be engaged and disengaged manually.

The primary object of the invention is the provision of a pneumatic spring equipped with a stopping device which is operated more simply than the known devices, yet is inexpensive to build.

In one of its more specific aspects, the stopping device of the invention responds to a first, relative, axial movement of the cylinder and piston rod of the otherwise conventional pneumatic spring for impeding axial relative movement of the same, yet responds to a second, different axial movement for releasing the cylinder and piston rod. Cooperating stop members of the stopping device are axially secured on the cylinder and the piston rod respectively and engage each other while relative movement of the two principal elements of the spring is impeded.

Other features, additional objects, and many of the attendant advantages of this invention will readily be appreciated as the same becomes better understood by reference to the following detailed description of preferred embodiments when considered in connection with the appended drawing in which.

Figure 1:
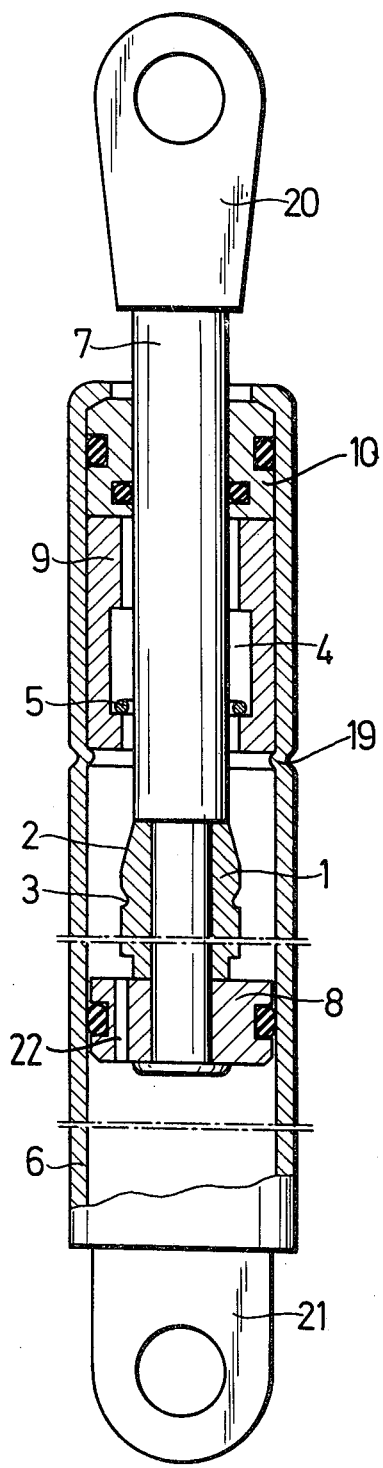
FIG. 1 shows a first pneumatic spring of the invention in section on its longitudinal axis.

Referring initially to FIG. 1, there is seen a pneumatic spring of conventional external appearance whose principal elements are a cylinder 6 and a piston rod 7. The piston rod is sealed for axial movement in a transverse end wall 10 of the cylinder 6. Axially remote ends of the piston rod 7 and the cylinder 6 carry respective fastening eyes 20, 21. The normally obscured axial end of the piston rod 7 in the cavity of the cylinder 6 is fixedly fastened to a piston 8 provided with a permanently open axial throttling passage 22. Air or nitrogen at a pressure greater than atmospheric pressure fills the remainder of the cylinder cavity and biases the piston rod 7 outward of the cavity. The structure described so far is well known.

The axial end portion of the piston rod 7 adjacent the piston 8 is reduced, and a sleeve 1 is axially secured between the piston 8 and the shoulder of the piston rod 7 which separates the reduced portion from the main portion of uniformly cylindrical shape partly visible outside the cylinder 6. The sleeve 1 has an axial face 2 which tapers conically in a direction from the piston 8 toward the main portion of the piston rod 7. The narrower end of the face 2 is equal in diameter with the main portion of the rod 7. A wider portion of the face 2, axially spaced from the narrower end, is provided with an annular groove 3 whose bottom has a diameter only slightly greater than that of the narrower end of the sleeve face 2.

A liner 9 is axially secured in the cavity of the cylinder 6 between the end wall 10 and an internal, annular rib 19 formed in the wall of the cylinder 6 by rolling. The inner diameter of the liner 9 is sufficient to receive the sleeve 1. A groove 4 in the inner face of the liner 9 receives a ring clip 5 of spring wire approximately coaxial with the cylinder 6. The depth of the groove 4 is sufficient for permitting substantial expansion of the split ring 5. The axial width of the groove 4 is approximately eight times the corresponding dimension of the ring 5. The stroke of the piston 8 is limited by its arresting abutment against the liner 9 and by abutment of the eye 20 against the end wall 10.

When one of the fastening eyes 20, 21 is attached to the frame of a motorcar, and the other eye is suitably attached to the trunk lid of the car, the piston rod 7 and cylinder 6 are secured against relative angular movement about the cylinder axis. The gas in the cylinder 6 tends to drive the piston rod 7 out of the cylinder 6, and thereby to swing the non-illustrated trunk lid toward the open position. The gas pressure in the cylinder 6 is preferably chosen so that the gas alone will move the lid from the closed position to a partly open position when the lid is unlocked, but that further force manually applied is needed fully to open the trunk lid.

When the trunk lid is raised toward the fully open position, the conical face 2 of the sleeve 1 enters the central aperture of the ring 5 and lifts the ring. When the ring abuts against the wall of the groove 4 near the end wall 10, further axial movement of the piston rod 7 outward of the cylinder cavity causes the ring 5 to be expanded as it moves over the conical face 2 in frictional engagement until it ultimately drops into the groove 3. When the lid is now released, it can drop only until the ring 5 retaining the sleeve 1 and the piston rod 7 reaches the position shown in FIG. 1.

Further movement of the trunk lid toward the closed position is possible only after a sufficient force is manually applied to expel the ring 5 from the groove 3. The radius of curvature of the groove 3 in the plane of FIG. 1 determines the force required for releasing the stopping mechanism. Release of the stopping device is facilitated if the trunk lid is first lifted, thereby to shift the ring 5 upward from the position illustrated, and by thereafter reversing the lid movement so that the ring abuts suddenly against the lower wall of the groove 4 and is stopped thereby, while the movement of the released piston rod 7 continues inward of the cylinder 6.

The stopping device described with reference to FIG. 1 is entirely concealed within the cylinder 6, and the user never sees it nor need he actually be aware of its existence. He merely handles the trunk lid. No more than one hand is needed for opening the lid, stopping it in its open position, releasing the stopping mechanism, and closing the lid.

Figure 2:
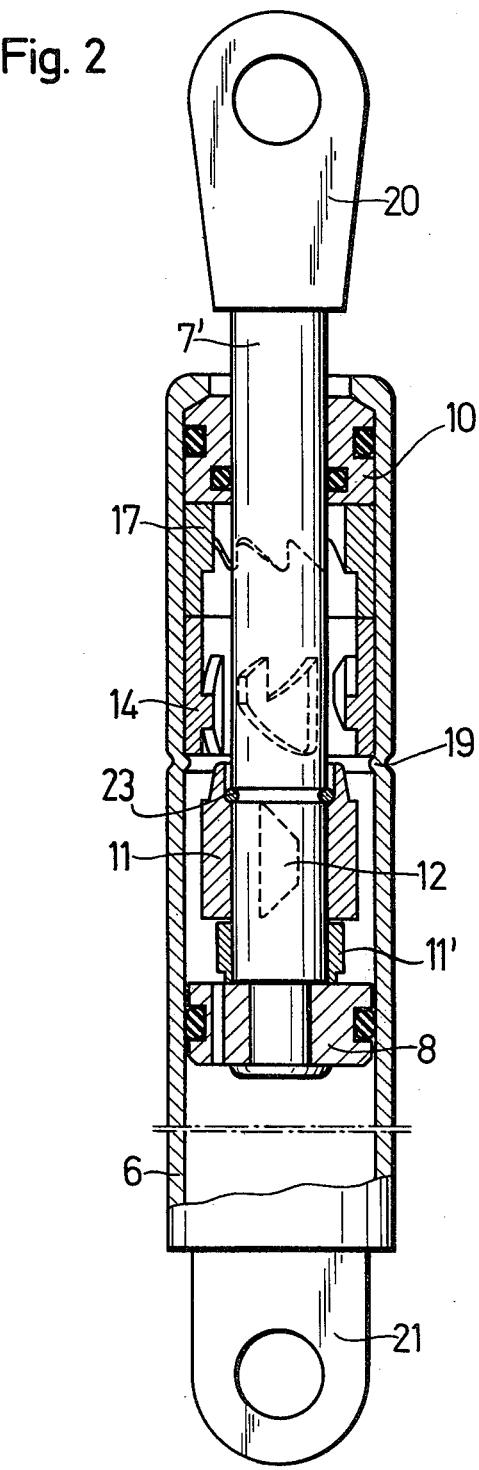
FIG. 2 illustrates a second embodiment in the manner of FIG. 1.
Figure 3:
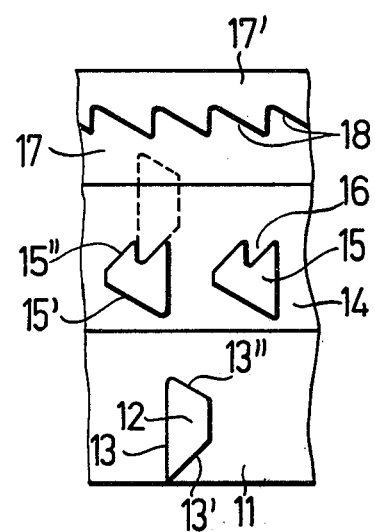
FIG. 3 is a fragmentary developed view of cams in the spring of FIG. 2.

Another pneumatic spring of the invention that may be locked in its extended position is shown in FIGS. 2 and 3. Referring initially to FIG. 2, there is seen a spring whose visible elements are identical with those described with reference to FIG. 1. A cylinder 6 and a piston rod 7' are the principal elements of the spring and carry respective fastening eyes 20, 21. The normally concealed portion of the piston rod 7' carries a piston 8, but is of generally uniform, circular cross section.

A cylindrical sleeve 11 and a spacer 11' are axially juxtaposed between the piston 8 and a spring clip 23 with sufficient clearance to permit free rotation of the sleeve 11 about the common axis of the cylinder 6, the piston rod 7, and the sleeve 11. The sleeve 11 carries four equiangularly spaced, radially outwardly projecting, integral cams 12 of which each has two axial flat faces 13 and two faces 13', 13'' obliquely transverse to the spring axis, as is best seen in FIG. 3.

The cylinder 6 carries two internal, axially juxtaposed sleeves 14, 17 between the rib 19 and the end wall 10 in a friction fit which also prevents angular displacement of the sleeves 14, 17 relative to the cylinder 6. The sleeve 14 carries a circular row of inwardly projecting cams 15 circumferentially spaced to permit passage of the cams 12 therebetween. Each cam 15 has two cam faces 15', 15'' obliquely inclined relative to the spring axis and is formed with a notch or recess 16 open axially toward the end wall 10.

The sleeve 17 carries a row of integral deflector teeth 17' similar in shape to saw teeth and having axial faces circumferentially alternating with obliquely inclined cam faces 18. The cam faces 13'' are parallel to the cam faces 15' and 18 when axially aligned with the same. The cams 12, 15, and the teeth 17' are located in a common cylindrical surface about the spring axis.

The pneumatic spring illustrated in FIGS. 2 and 3, when installed between the trunk lid and the frame of a motorcar, operates as follows:

When the trunk lid is unlocked, the expanding air in the cylinder 6 expels the piston rod 7' and thereby lifts the trunk lid until the weight of the trunk lid balances the force exerted by the air. The air then facilitates further manual opening of the lid.

As the lid approaches the open position, the condition of the spring shown in FIG. 2 is reached and passed as the cams 12 move toward the cams 15. If the angular position of the cams 12, 15, initially is as shown in FIG. 3, the cam faces 13'' and 15' are abuttingly engaged and cause the sleeve 11 to be turned until the cams 12 can pass axially between pairs of cams 15. During further opening movement of the trunk lid, each cam face 13'' engages an oblique cam face 18 on one of the deflector teeth, and the sleeve 11 is turned further nuntil the cams 12 no longer are aligned with the passages between two adjacent cams 15 but with the cams 15 themselves. When the trunk lid now is released, its weight causes the cams 12 to approach the axially aligned cams 15, and the acute points between the cam faces 13' and axial faces 13 of the cams 12 are seated in notches 16 of cams 15, as shown in FIG. 3 in broken lines, whereby the sleeve 11 again is turned through a small angle. The lid is held in the open position.

When it is desired to close the trunk, the lid is manually raised a little so that the cam faces 13'' are again engaged with cam faces 18 of deflector teeth 17', and the sleeve 11 is turned into a position in which the cams 12 are aligned with passages between two cams 15. The trunk lid may now be lowered under the combined forces of gravity and of the operator.

The stopping device in the pneumatic spring shown in FIG. 2 is capable of obvious modifications without significant change in its mode of operation. Thus, the sleeve 11 may be fixedly fastened on the piston rod 7' if the sleeves 14 and 17 are made rotatable. It is only necessary that there be relative angular movement between the sleeve 11 and the sleeves 14, 17.

The pneumatic springs illustrated and described above are capable of numerous applications other than that chosen for illustration.. The locking device of the invention may be modified for such other applications to lock the piston rod to the cylinder when the overall length of the spring is not at its maximum, as illustrated, but at its minimum, and it will be simple on the basis of the above teachings to provide a pneumatic spring with stopping devices which impede relative axial movement of the cylinder and of the piston rod in both axially terminal positions of the associated piston.

All operating elements of the stopping mechanism are protected in the cylinder cavity against contamination. Being of simple shape and not relying on critically precise dimensions for operativeness, they have a useful life comparable to that of any other element of the pneumatic spring. They need no maintenance.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A pneumatic spring comprising:
   a. a cylinder having an axis and bounding a sealed cavity therein;
   b. a piston axially movable in said cavity;
   c. a piston rod axially fastened to said piston and extending outward of said cavity in movable, sealing engagement with said cylinder, said piston rod and said cylinder constituting the two principal elements of said spring;
   d. a gas under a pressure higher than atmospheric pressure retained in said cavity and biasing said piston rod outward of said cavity;
   e. stop means responsive to a first relative axial movement of said elements for impeding relative axial movement of said elements,
      1. said stop means responding to a second axial movement of said elements different from said first movement for releasing said elements,
      2. said stop means including cooperating stop members axially secured to said elements respectively,
      3. said stop members engaging each other while said stop means impede said axial movement; and
   f. means for securing said elements against relative angular movement during said relative axial movements thereof.

2. A spring as set forth in claim 1, wherein said stop members are arranged in said cavity.

3. A spring as set forth in claim 2, further comprising arresting means for arresting said piston in said cavity in a first and second terminal, axial position, said piston rod moving inward of said cavity during movement of said piston from said first toward said second terminal position, said stop means stopping said axial movement in response to said piston closely approaching said first position thereof.

4. A spring as set forth in claim 1, wherein said stop members frictionally engage each other while said stop means impede said axial movement.

5. A spring as set forth in claim 1, wherein said piston rod is fastened to said piston in angularly fixed relationship.

6. A spring as set forth in claim 1, wherein said stop members abuttingly engage each other while said stop means impede said axial movement.

7. A pneumatic spring comprising:
   a. a cylinder having an axis and bounding a sealed cavity therein;
   b. a piston axially movable in said cavity;
   c. a piston rod axially fastened to said piston and extending outward of said cavity in movable, sealing engagement with said cylinder, said piston rod and said cylinder constituting the two principal elements of said spring;
   d. a gas under a pressure higher than atmospheric pressure retained in said cavity and biasing said piston rod outward of said cavity; and
   e. stop means responsive to a first relative axial movement of said elements for impeding relative axial movement of said elements,
      1. said stop means responding to a second axial movement of said elements different from said first movement for releasing said elements,
      2. said stop means including cooperating stop members axially secured to said elements respectively,
      3. said stop members engaging each other while said stop means impede said axial movement,
      4. one of said stop members being conical and mounted on said piston rod, said conical stop member tapering in the direction of movement of said piston rod,
      5. a portion of said conical stop member spaced from the narrower end of said stop member in said direction being formed with a groove in a plane transverse to said direction,
      6. the other stop member being a resiliently expandable ring formed with a central aperture dimensioned to receive said narrower end when said ring is in the relaxed condition, but too small to receive said portion without being expanded,
      7. said cylinder carrying abutment means in said cavity for limiting axial movement of said ring.

8. A spring as set forth in claim 7, wherein said abutment means bound an annular groove extending about said axis and open toward said axis, said ring being at least partly received in said groove, the axial width of said groove being greater than twice the axial dimension of said ring.

9. A pneumatic spring comprising:
   a. a cylinder having an axis and bounding a sealed cavity therein;
   b. a piston axially movable in said cavity;
   c. a piston rod axially fastened to said piston and extending outward of said cavity in movable, sealing engagement with said cylinder, said piston rod and said cylinder constituting the two principal elements of said spring;
   d. a gas under a pressure higher than atmospheric pressure retained in said cavity and biasing said piston rod outward of said cavity; and
   e. stop means responsive to a first relative axial movement of said elements for impeding relative axial movement of said elements,
      1. said stop means responding to a second axial movement of said elements different from said first movement for releasing said elements,
      2. said stop means including a first cam member, a second cam member, and a deflector member,
      3. said first cam member being mounted in axially fixed position on one of said elements, said second cam member and said deflector member being mounted on the other element in respective axially spaced positions,
      4. said one cam member being arranged for angular movement about said axis relative to said second cam member and said deflector member,
      5. said second cam member and said deflector member having respective faces oblique relative to said axis and engageable with said first cam member during said axial relative movement of said elements for causing said angular movement of said first cam member.

10. A pneumatic spring comprising:
    a. a cylinder having an axis and bounding a sealed cavity therein;
    b. a piston axially movable in said cavity;
    c. a piston rod axially fastened to said piston and extending outward of said cavity in movable, sealing engagement with said cylinder, said piston rod and said cylinder constituting the two principal elements of said spring;
    d. a gas under a pressure higher than atmospheric pressure retained in said cavity and biasing said piston rod outward of said cavity; and
    e. stop means responsive to a first relative axial movement of said elements for impeding relative axial movement of said elements,
       1. said stop means responding to a second axial movement of said elements different from said first movement for releasing said elements,
       2. said stop means including cooperating stop members axially secured to said elements respectively,
       3. said stop members engaging each other while said stop means impede said axial movement,
       4. one of said stop members including a first cam, said one stop member being mounted on one of said elements for rotation about said axis, and the other stop member including a plurality of second cams spacedly distributed about said axis, the spacing of said second cams being sufficient to permit axial passage of said first cam between said second cams during relative axial movement of said elements in one direction,
       5. said stop means further including deflector means on said other element engageable with said first cam for rotating said one stop member in response to said passage into a position of axial alignment of said first cam with one second cam, whereby said aligned cams abuttingly engage each other during relative movement of said elements in an axial direction opposite to said one direction after said passage.

11. A spring as set forth in claim 10, wherein said deflector means further include means for deflecting said first cam out of alignment with said one second cam in response to movement of said first cam in said one direction out of abutting engagement with said one second cam.

* * * * *